(12) United States Patent
Castro et al.

(10) Patent No.: US 11,884,215 B2
(45) Date of Patent: Jan. 30, 2024

(54) REAR-VIEW CAMERA FOR PICK-UP TRUCKS WITH OPEN TAILGATES

(71) Applicant: Continental Automotive Systems, Inc., Auburn Hills, MI (US)

(72) Inventors: Aranza Hinojosa Castro, Ferndale, MI (US); Ibro Muharemovic, Warren, MI (US); Alexandru Mihu, Rochester, MI (US); Ravikanth Uppara, Seaford (GB)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 17/595,211

(22) PCT Filed: May 15, 2020

(86) PCT No.: PCT/US2020/033102
§ 371 (c)(1),
(2) Date: Nov. 11, 2021

(87) PCT Pub. No.: WO2020/232346
PCT Pub. Date: Nov. 19, 2020

(65) Prior Publication Data
US 2022/0212603 A1 Jul. 7, 2022

Related U.S. Application Data

(60) Provisional application No. 62/848,405, filed on May 15, 2019.

(51) Int. Cl.
*B60R 1/26* (2022.01)
*B60R 1/00* (2022.01)
(Continued)

(52) U.S. Cl.
CPC ............... *B60R 1/26* (2022.01); *B60R 1/003* (2013.01); *B60R 11/04* (2013.01);
(Continued)

(58) Field of Classification Search
None
See application file for complete search history.

(56) References Cited

U.S. PATENT DOCUMENTS

| 2015/0183380 A1 | 7/2015 | Da Deppo et al. |
| 2017/0163939 A1 | 6/2017 | Thompson et al. |

(Continued)

FOREIGN PATENT DOCUMENTS

| JP | 2002524348 A | 8/2002 |
| JP | 2007131252 A | 5/2007 |

(Continued)

OTHER PUBLICATIONS

International Search Report and the Written Opinion of the International Searching Authority dated Jul. 3, 2020 for the counterpart PCT Application No. PCT/US2020/033102.

(Continued)

*Primary Examiner* — Rebecca A Volentine

(57) ABSTRACT

One general aspect includes a driver assistance system for a vehicle. The driver assistance system also includes a camera system having at least one rear camera constructed and arranged to obtain an image of an area behind a rear of the vehicle; a tailgate position determining system constructed and arranged to determine a position of a tailgate of the vehicle, and where the image provided by the camera system of the rear of the vehicle is selected based upon the position of the tailgate of the vehicle.

8 Claims, 8 Drawing Sheets

(51) Int. Cl.
  *B60R 11/04* (2006.01)
  *B60R 11/00* (2006.01)
(52) U.S. Cl.
  CPC ... *B60R 2011/004* (2013.01); *B60R 2300/101* (2013.01); *B60R 2300/105* (2013.01); *B60R 2300/70* (2013.01)

(56) References Cited

U.S. PATENT DOCUMENTS

| | | |
|---|---|---|
| 2018/0001820 A1 | 1/2018 | Higgins |
| 2018/0072227 A1 | 3/2018 | Kato |
| 2018/0086283 A1 | 3/2018 | Green |
| 2018/0215313 A1* | 8/2018 | Diessner ................ B60R 1/00 |
| 2018/0220081 A1 | 8/2018 | Lewis et al. |
| 2019/0118729 A1 | 4/2019 | Hartland |
| 2019/0228235 A1* | 7/2019 | Murad ................ G06V 20/56 |
| 2019/0329718 A1 | 10/2019 | Kanaya |

FOREIGN PATENT DOCUMENTS

| | | |
|---|---|---|
| JP | 2012165138 A | 8/2012 |
| JP | 2018043643 A | 3/2018 |
| JP | 2018069861 A | 5/2018 |
| JP | 2018134885 A | 8/2018 |

OTHER PUBLICATIONS

Notice of Reasons for Refusal dated Nov. 8, 2022 for the counterpart Japanese Patent Application No. 2021-568162.
Notice of Reasons for Refusal dated May 30, 2023 for the counterpart Japanese Patent Application No. 2021-568162.
European Examination Report dated Oct. 5, 2023 for the counterpart European Patent Application No. 20 731 642.3.
Decision to Grant a Patent drafted Nov. 13, 2023 for the counterpart Japanese Patent Application No. 2021-568162 and translation of same.

* cited by examiner

REAR-VIEW CAMERA FOR PICK-UP TRUCKS WITH OPEN TAILGATES

TECHNICAL FIELD

This invention relates to advanced driver assist systems and, in particular, to a system having a rear-view camera system that provides the driver with a simultaneous view or indication of objects that may be behind and that may be crossing the vehicle.

BACKGROUND

Rear-view cameras are required on all new U.S. vehicles. The camera field of view commonly covers the immediate area directly behind the vehicle. The information collected by the rear-view camera may be used by multiple safety and assistance systems in the vehicles. Such systems may include but are not limited to, vehicle backing assist systems, parking assist system, trailer towing assistance systems, etc.

One common mounting location for such rear-view cameras on pick-up trucks may be on the truck tailgate proximate to the tailgate handle, as shown in FIG. 1A. The camera field of view provided by such a mounting location is shown in FIG. 1B. However, truck operators regularly open or lower the bed of a pick-up truck to accommodate goods longer than the bed length or for various other reasons. When the tailgate is in an open position the camera field of view has changed, shown in FIG. 1C.

While driving in this position the camera is not providing a field of view that meets the requirements associated with rear-view cameras. Additionally, the information provided to the safety and assistance systems in the vehicles may not be available due to fact that the field of view is not aimed in the necessary direction. Thus, there is a need to provide a driver assistance system having a rear-view camera that provides a desired field of view even when the tailgate is in an open position.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One general aspect includes a driver assistance system for a vehicle. The driver assistance system also includes a camera system having at least one rear camera constructed and arranged to obtain an image of an area behind a rear of the vehicle; a tailgate position determining system constructed and arranged to determine a position of a tailgate of the vehicle, and where the image provided by the camera system of the rear of the vehicle is selected based upon the position of the tailgate of the vehicle.

Implementations may include one or more of the following features. The system the electronic control unit includes a processor circuit constructed and arranged to create the image from the data received from the camera system.

The system may include a first camera located on a tailgate of the vehicle and a second camera located proximate a central rear brake light of the vehicle.

The system may include a first camera located on a tailgate of the vehicle and a second camera located on a tailgate of the vehicle.

The second camera is on an opposing side of a tailgate lift handle.

The camera is moveable between a first position and a second position.

The system may include an actuator system capable of moving the camera between the first position and the second position.

The display system includes a display screen.

One general aspect includes a method of providing a rear image for a vehicle. The method of providing also includes providing an image of an area behind a rear of the vehicle with at least a first camera; determining a tailgate position with a tailgate position determining system, and selecting the image provided based upon the position of the tailgate of the vehicle.

Implementations may include one or more of the following features. The method the electronic control unit includes a processor circuit constructed and arranged to create the image from the data received from the camera system.

The method may include a first camera located on a tailgate of the vehicle and a second camera located proximate a central rear brake light of the vehicle.

The method may include a first camera located on a tailgate of the vehicle and a second camera located on a tailgate of the vehicle.

The second camera is on an opposing side of a tailgate lift handle.

The camera is moveable between a first position and a second position.

The method may include an actuator system capable of moving the camera between the first position and the second position.

The display system includes a display screen.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1A:
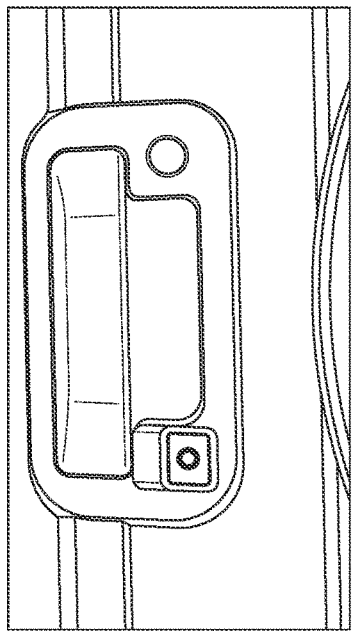
FIG. 1A is a schematic illustration of a vehicle having a rear-view camera system of the prior art.
Figure 1C:
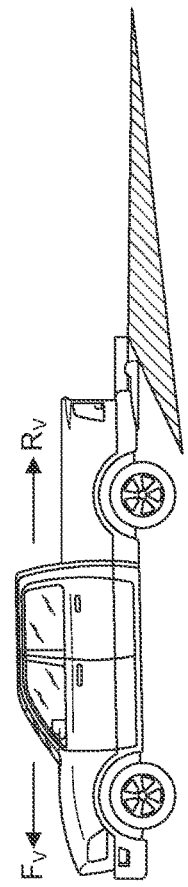
FIG. 1C is a schematic illustration of a field of view when a vehicle tailgate is open for the rear-view camera system of the prior art.
Figure 1B:
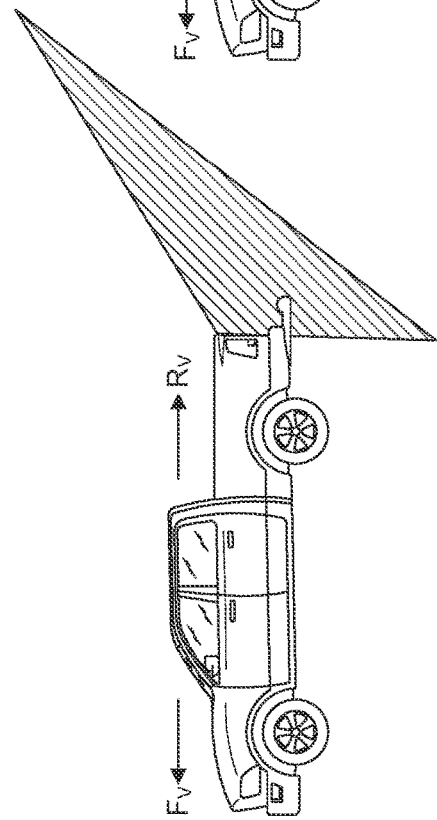
FIG. 1B is a schematic illustration of a field of view when a vehicle tailgate is closed for the rear-view camera system of the prior art.
Figure 2:
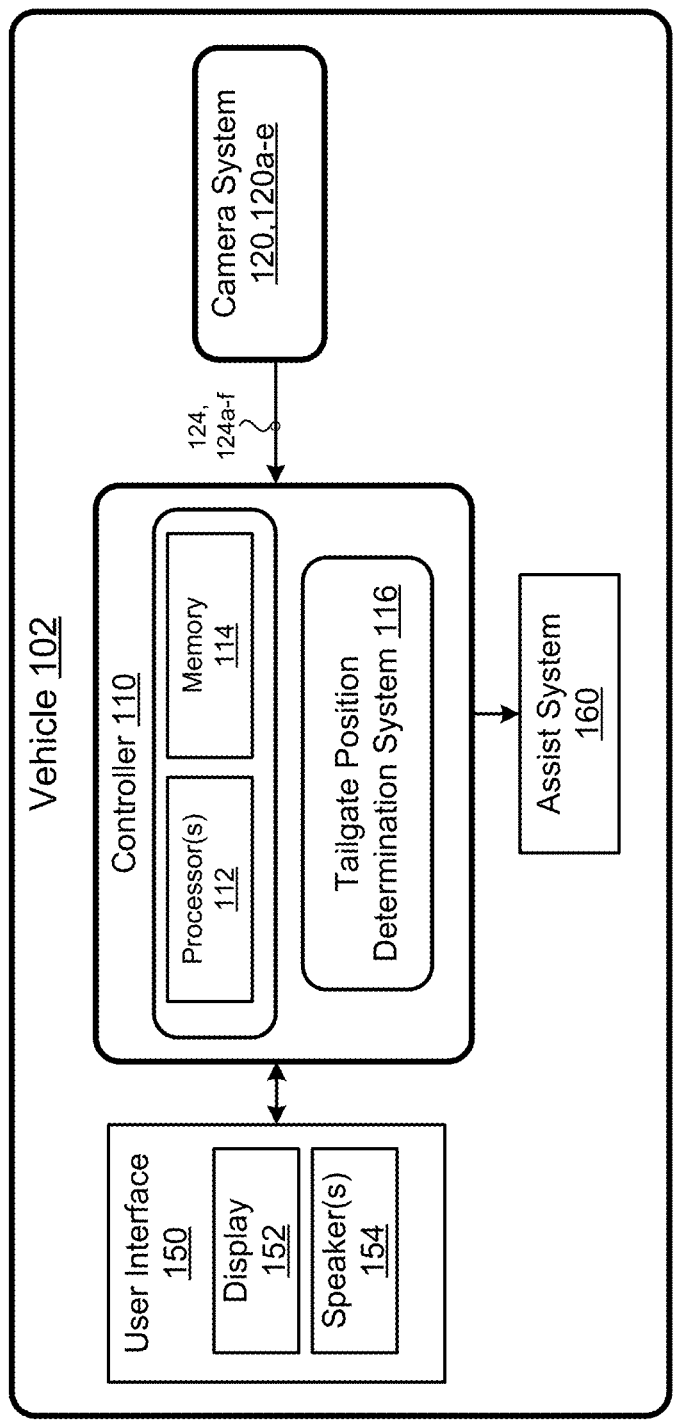
FIG. 2 is a schematic view of a vehicle having the rear-view camera system of the present invention.

With reference to FIGS. 2-6B, a rear-view camera system, for a vehicle 102, is shown generally indicated at 100 in accordance with an embodiment of the invention. The system 100 includes a plurality of cameras 120 mounted to the vehicle 102 and constructed and arranged to obtain an image of an area proximate to and surrounding the vehicle 102. The plurality of cameras 120 may be a monocular camera, binocular camera, or another type of sensing device capable of providing a view of the front, side or rear field-of-view of the vehicle 102.

The vehicle 102 may include a controller 110 that includes a computing device (or hardware processor) 112 (e.g., central processing unit having one or more computing processors) in communication with non-transitory memory or hardware memory 114 (e.g., a hard disk, flash memory, random-access memory) capable of storing instructions executable on the computing processor(s) 112.

The vehicle controller 110 executes a tailgate position determination system 116 which determines whether a tailgate 104 of the vehicle 102 is in a closed (lifted) position 106a or open (lowered) position 106b and provides a rear-view image according to the determination as explained in further detail below.

A first camera 120a is a rear-view camera mounted to the tailgate 104 of the vehicle 102. Other camera may include front view cameras 120b, side view cameras 120c, d and possibly additional rear-view cameras 120e. The camera(s) 120, 120a-e send information to the controller 110 for use by and for various vehicle safety and assist systems 160.

The tailgate position determining system 116 may detect the tailgate position 106a, 106b using image processing and automatically select the camera source arrangement for the rear view based on the tailgate position 106a, 106b. The tailgate position system 116 may use image analysis to determine if the camera 120, 120a-e is pointing toward the ground, i.e. tailgate is open and camera 120, 120a-e is downward, not rearward of the vehicle 102. Alternatively, the tailgate position may be detected by another type of sensors, such as a position sensor. Finally, the tailgate position determining system 116 may work with a user interface 150 to allow a vehicle operator to manually select the appropriate camera source.

For embodiments which also include the user interface 150 that allows the driver and the controller 110 to exchange information. In some examples, the user interface 150 includes a display 152 and/or speakers 154. In some examples, the display 152 is a touch screen display. In other examples, the display 152 is in communication with one or more input mechanisms allowing the driver to input data or make a selection on the display 152. The input mechanism may be a rotary knob or a mouse. The display system 152 can be located at the center console 153 of the vehicle 102 be controlled by the ECU to display to a driver of the vehicle, the image 122 obtained by the rear-view camera(s) 120, 120a, 120e and the image 122 developed by the ECU 110. The driver may manually select the image 122 from the desired camera 120, 120a-e.

Further, instead of providing the display screen 152 in the console, the display screen 152 can be incorporated in the rear view mirror of the vehicle, or the images 122 can be shown via a heads-up display system or can be projected onto any surface of the vehicle 102.

As discussed above, tailgate position determining system 116 may detect the tailgate position 106a, 106b using image processing and automatically select the camera source arrangement for the rear view based on the tailgate position 106a, 106b. Specifically selecting use of the first camera 120a and/or second camera 120e. Alternatively, the tailgate position may be detected by another type of sensors, such as a position sensor. Finally, the tailgate position determining system 116 may work with a user interface 150 to allow a vehicle operator to manually select the appropriate camera source.

Figure 3B:
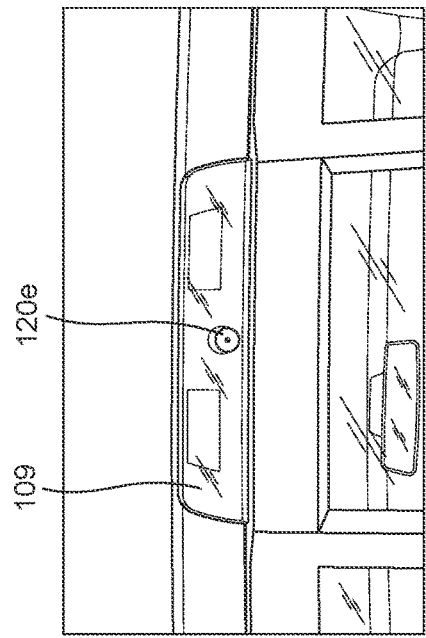
FIG. 3B is a schematic illustration of a vehicle of the first embodiment having a second camera of the rear-view camera system of the present invention.
Figure 3A:
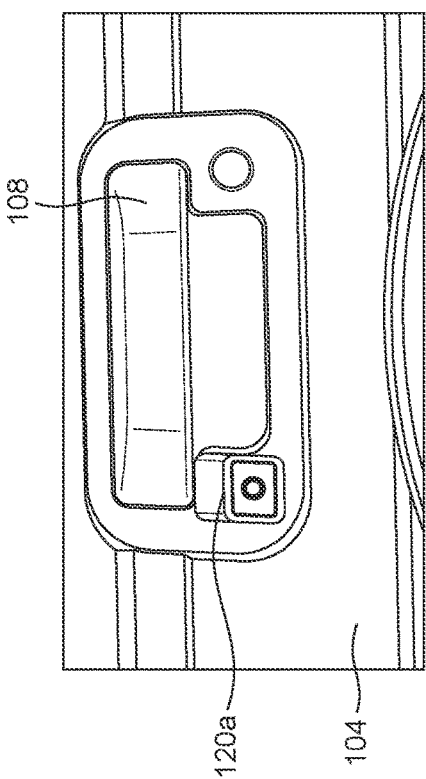
FIG. 3A is a schematic illustration of a vehicle of a first embodiment having a first camera of a rear-view camera system of the present invention.
Figure 3C:
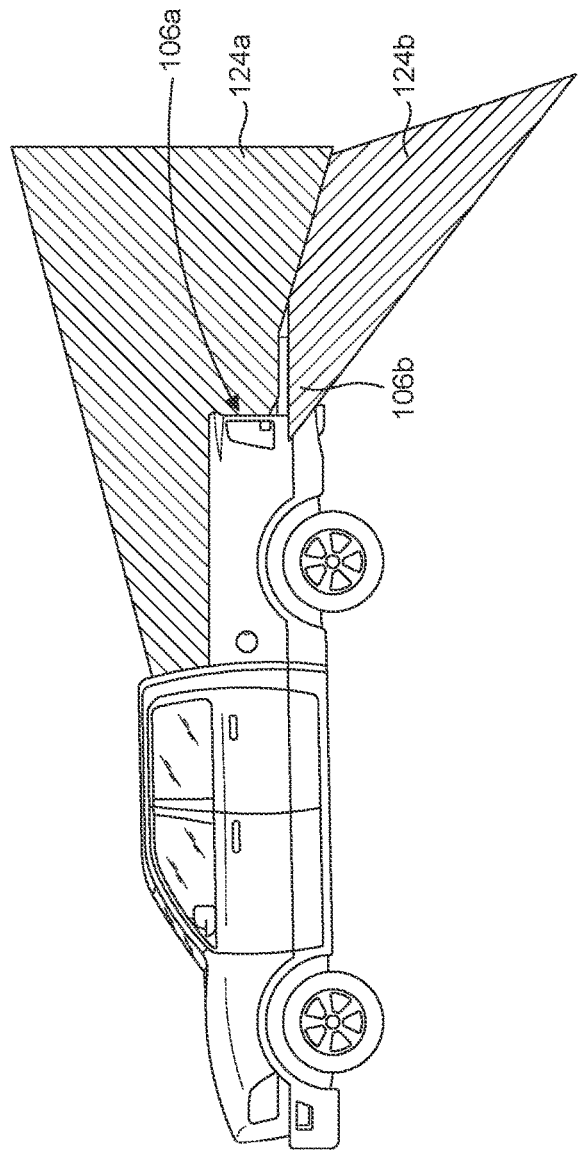
FIG. 3C is a schematic illustration of a field of view when the vehicle tailgate is open for the first embodiment of the rear-view camera system of FIGS. 3A-3B.
Figure 4:
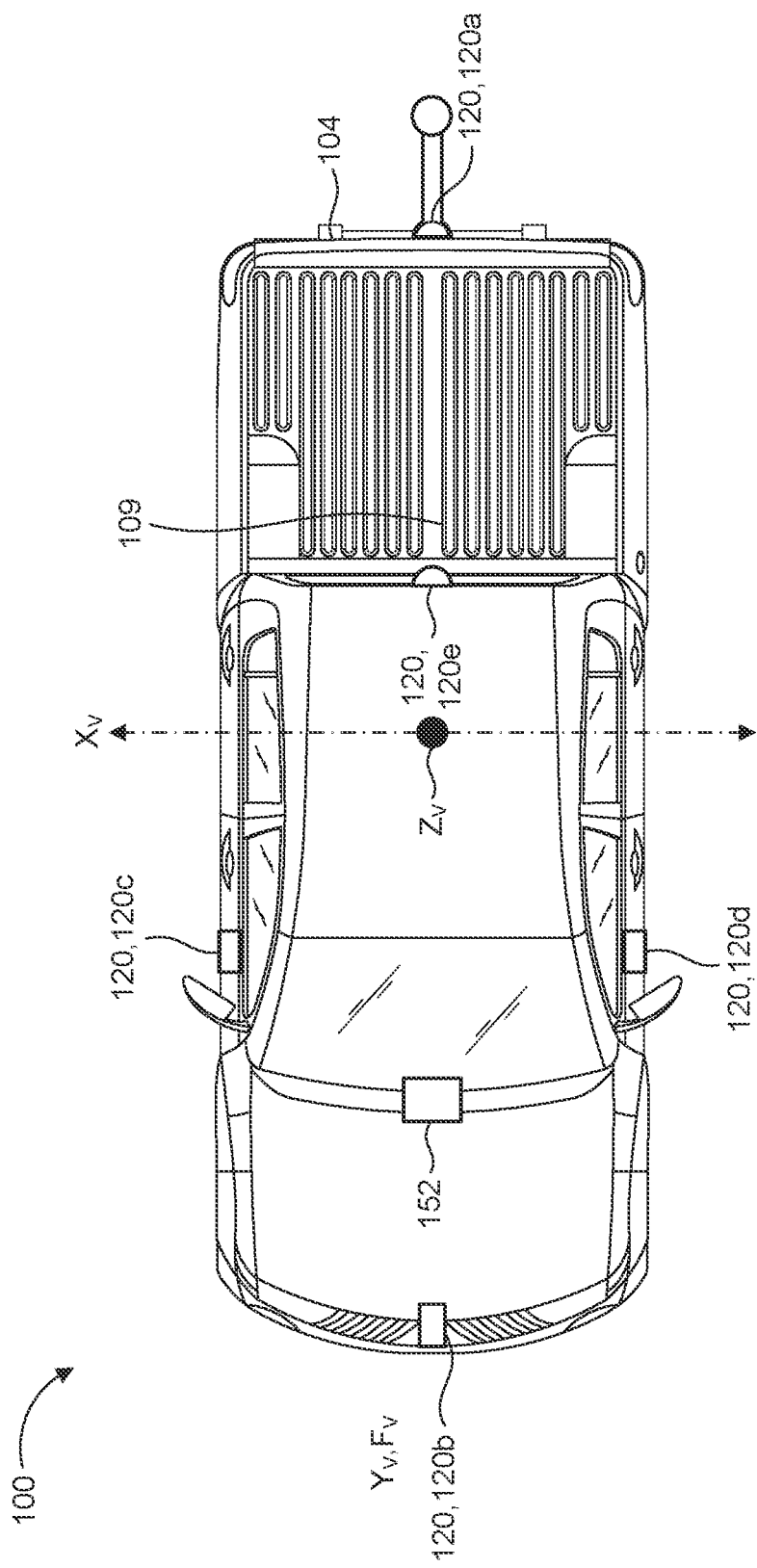
FIG. 4 is a schematic illustration of the vehicle of the first embodiment of the rear-view camera system of FIGS. 3A-3C.

Referring to FIGS. 3A-4, a first embodiment of a camera system 100 for a vehicle 102 is schematically illustrated. The system includes at least a first rear view camera 102a mounted on a tailgate 104 of the vehicle proximate to the tailgate lift handle 108. A second rear-view camera 102e is mounted to a rear brake light 109 proximate to the top of the passenger cab 103.

When the tailgate 104 is in the closed position 106a the first rear camera 120a is typically used to provide an image 122 to the vehicle safety and assist systems 160. Alternately, the second rear camera 120e may be used alone or in combination with first camera 120a by stitching the images together. Further that image may also be shown on a display 152. Field of view provided by both cameras 120a, 120e when the tail gate is closed is not illustrated.

When the tailgate 104 is in the open position both the first camera 120a and the second rear camera 120e are used to provide the image 122. The images from both cameras 120a, 120e may be stitched together into a single image 122. Field of view provided by the cameras 120a, 120e when the tail gate is open is illustrated at 124a plus 124b.

Figure 5A:
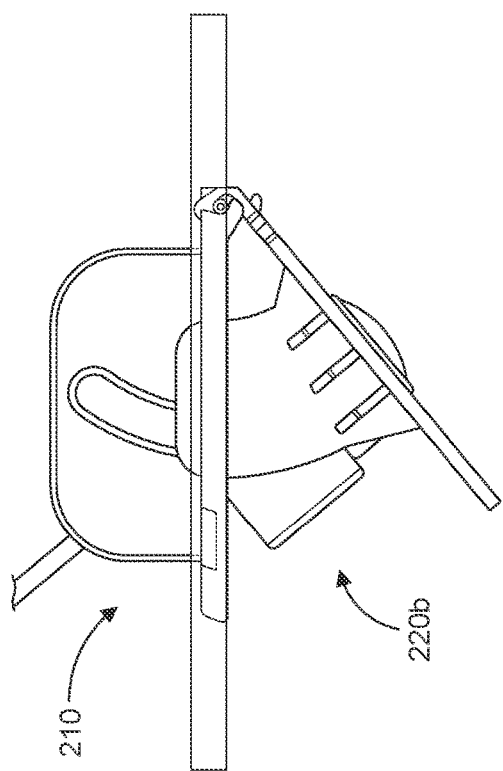
FIG. 5A is a schematic illustration of a camera position the vehicle tailgate is closed for a second embodiment of the rear-view camera system of the present invention.
Figure 5B:
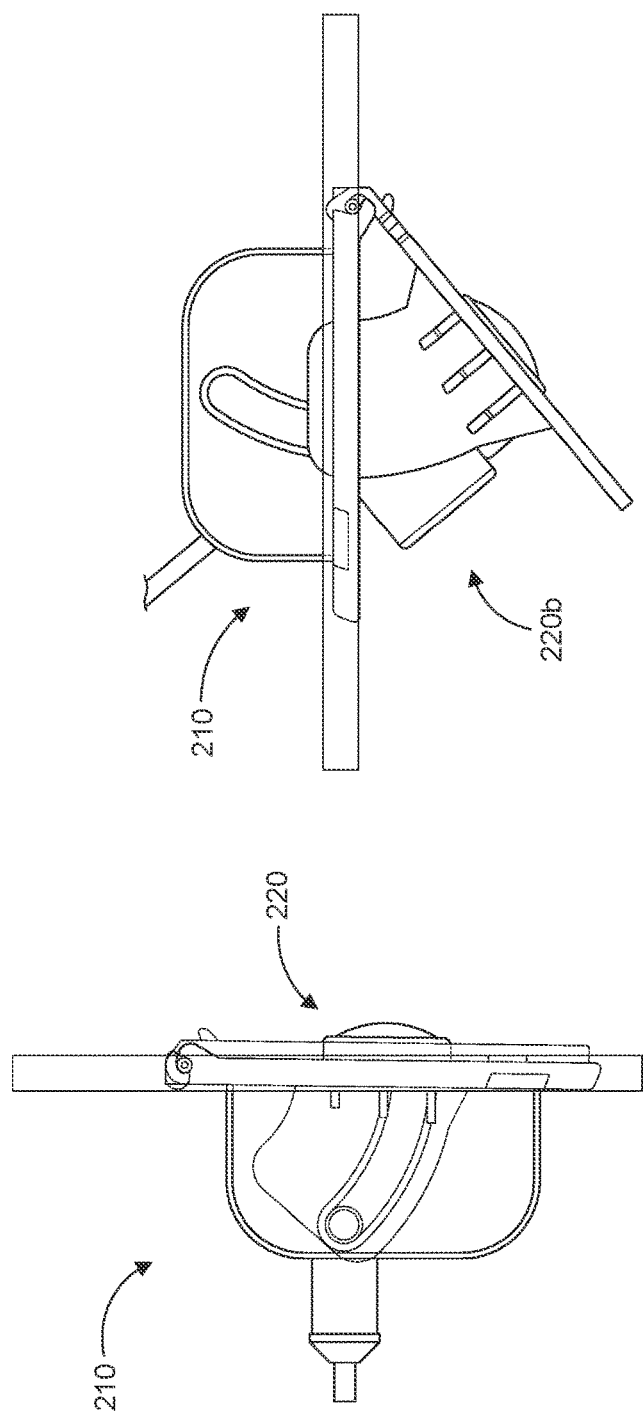
FIG. 5B is a schematic illustration of a camera position the vehicle tailgate is open for a second embodiment of the rear-view camera system of the present invention.
Figure 5C:
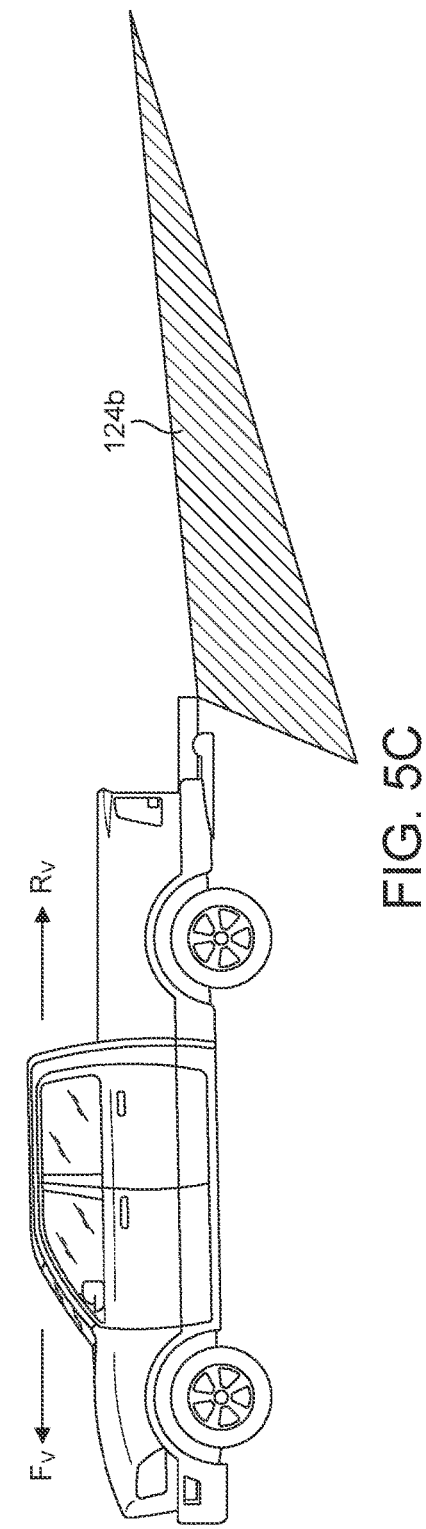
FIG. 5C is a schematic illustration of a field of view when the vehicle tailgate is open for the second embodiment of the rear-view camera system of FIGS. 4A-4B.

Referring to FIGS. 5A-5C, a second embodiment of a camera system 100 for a vehicle 102 is schematically illustrated. The system includes a rear-view camera 102a mounted on a tailgate 104 of the vehicle proximate to the tailgate lift handle 108. The camera 102a is moveably secured to the tailgate 104 by an actuator system 200. The actuator 210 (not shown) may be an electromechanical actuator capable of moving the camera 102a from a first position 220a, illustrated in FIG. 5A to a second position 220b, illustrated in FIG. 5B. The camera 120a is located in a camera housing 212 which rotates about a hinged attachment 214.

The tailgate position determining system 116 may detect the tailgate position 106a, 106b and activate the actuator system 200 to move the camera 102a to the appropriate position 220a, 220b. When the tailgate 104 is in the closed position 106a the first camera position 220a is used to provide an image 122 to the vehicle safety and assist systems 160. When the tailgate 104 is in the open position 106b the second camera position 220b is used to provide the image 122. Field of view provided by the second camera position 220b when the tail gate is open is illustrated at 124b.

As discussed above, tailgate position determining system 116 may detect the tailgate position 106a, 106b using image processing and automatically select the camera source arrangement for the rear view based on the tailgate position 106a, 106b.

Alternatively, the tailgate position may be detected by another type of sensors, such as a position sensor. Finally, the tailgate position determining system 116 may work with a user interface 150 to allow a vehicle operator to manually select the appropriate camera source. Based on the determined position the tailgate position determining system 116 may send a signal to the actuator system to activate the actuator 200 to move toward the desired first or second position 220a, 220b based upon the determination.

Figure 6A:
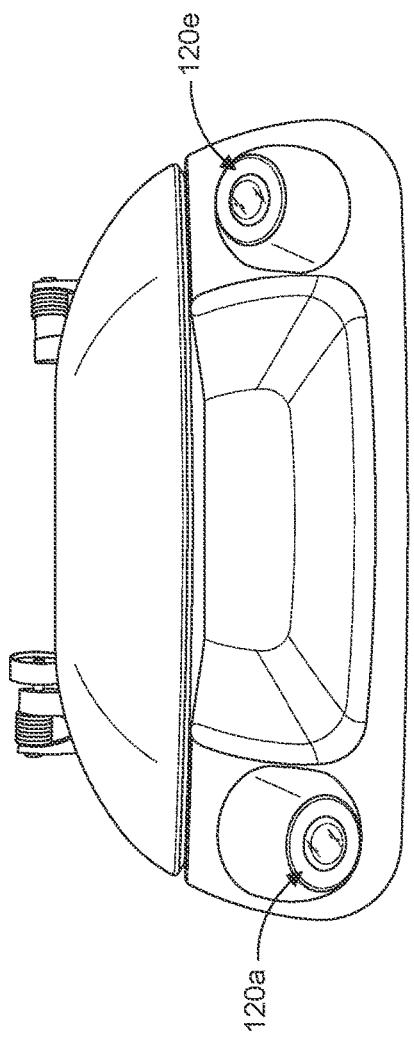
FIG. 6A is a schematic illustration of another embodiment of a camera system for a vehicle having first and second cameras.
Figure 6B:
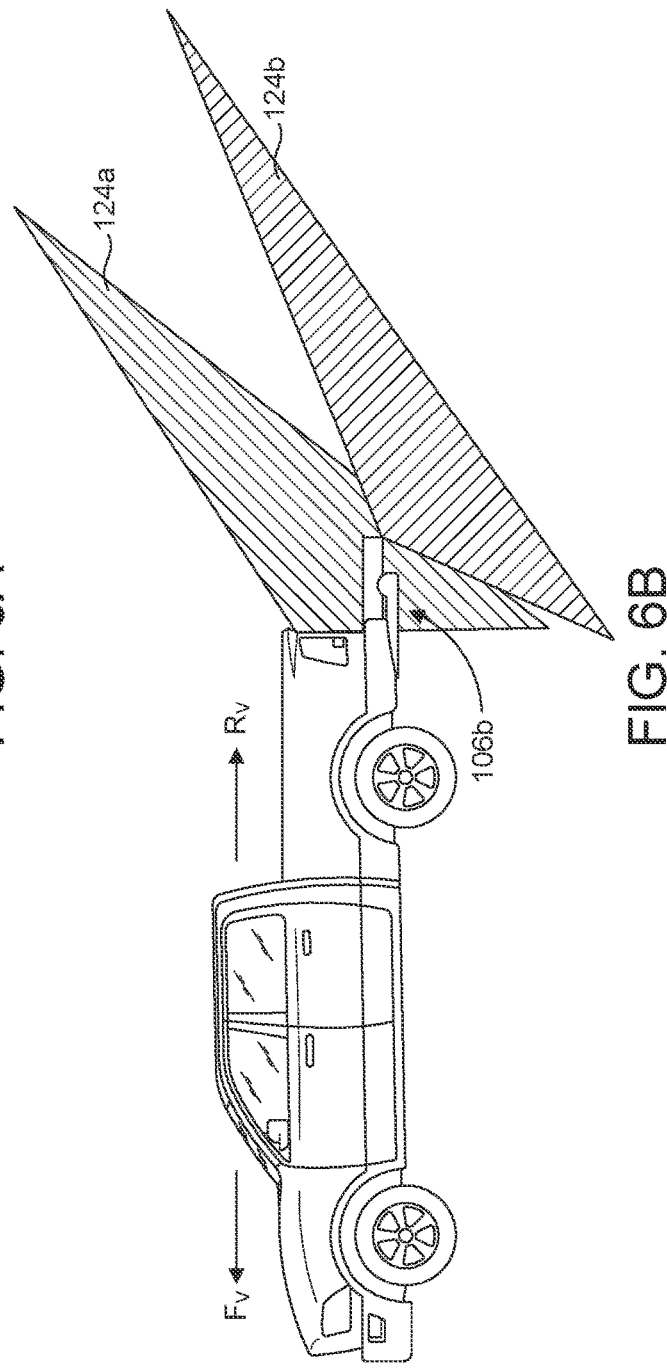
FIG. 6B is a schematic illustration of a field of view of the embodiment of FIG. 6A when the vehicle tailgate is open.

Referring to FIGS. 6A and 6B, a third embodiment of a camera system 100 for a vehicle 102 is schematically illustrated. The system includes at least a first rear view camera 102a mounted on a tailgate 104 of the vehicle proximate to the tailgate lift handle 108. A second rear-view camera 102e is also mounted on the tailgate 104 of the vehicle proximate to the tailgate lift handle 108. The first camera 120a and second camera 120e may be located on opposing sides of the handle 108.

The first camera 120a and second camera 120e both have fixed positions. When the tailgate 104 is in the closed position 106a the first rear camera 120a is used to provide an image 122 to the vehicle safety and assist systems 160. Field of view provided by the first cameras 120e when the tail gate is closed is illustrated at 124a.

When the tailgate 104 is in the open position 106b the second camera 120e is used to provide the image 122. Field of view provided by the second camera 120e when the tail gate is open is illustrated at 124b.

As discussed above, tailgate position determining system 116 may detect the tailgate position 106a, 106b using image processing and automatically select the camera source arrangement for the rear view based on the tailgate position 106a, 106b. Specifically selecting use of the first camera 120a and/or second camera 120e. Alternatively, the tailgate position may be detected by another type of sensors, such as a position sensor. Finally, the tailgate position determining system 116 may work with a user interface 150 to allow a vehicle operator to manually select the appropriate camera source.

Figure 7:
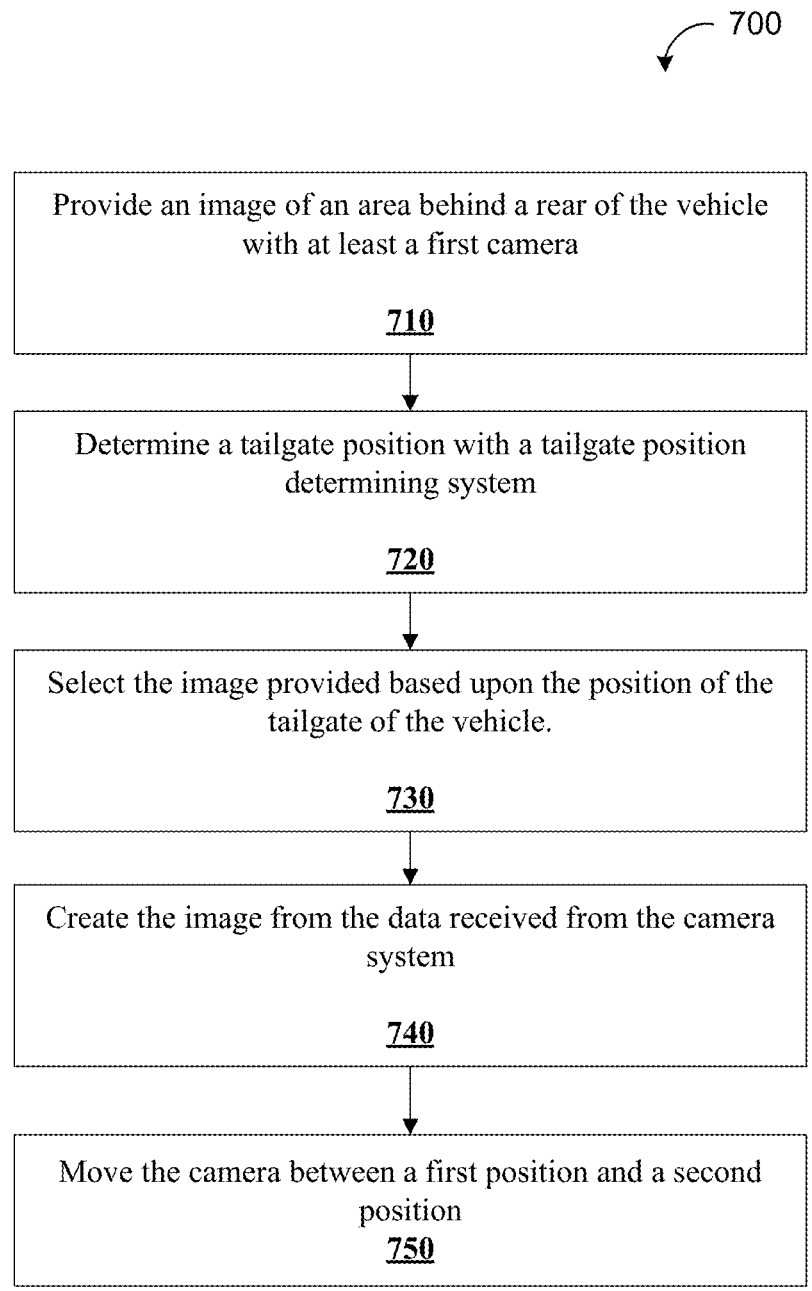
FIG. 7 is a flowchart depicting a method for providing a ream image for a vehicle according to another embodiment.

FIG. 7 illustrates method, shown at 700, of providing a rear image for a vehicle is described here. The method of providing also includes providing an image of an area behind a rear of the vehicle with at least a first camera, step 710; determining a tailgate position with a tailgate position determining system, step 720; and selecting the image provided based upon the position of the tailgate of the vehicle, step 730.

Implementations may include one or more of the following features. The method the electronic control unit includes a processor circuit constructed and arranged to create the image from the data received from the camera system, step 740.

The method may include a first camera located on a tailgate of the vehicle and a second camera located proximate a central rear brake light of the vehicle. The method may include a first camera located on a tailgate of the vehicle and a second camera located on a tailgate of the vehicle. The second camera is on an opposing side of a tailgate lift handle. The camera is moveable between a first position and a second position, step 750. The method may include an actuator system capable of moving the camera between the first position and the second position. The display system includes a display screen.

Figure 8:
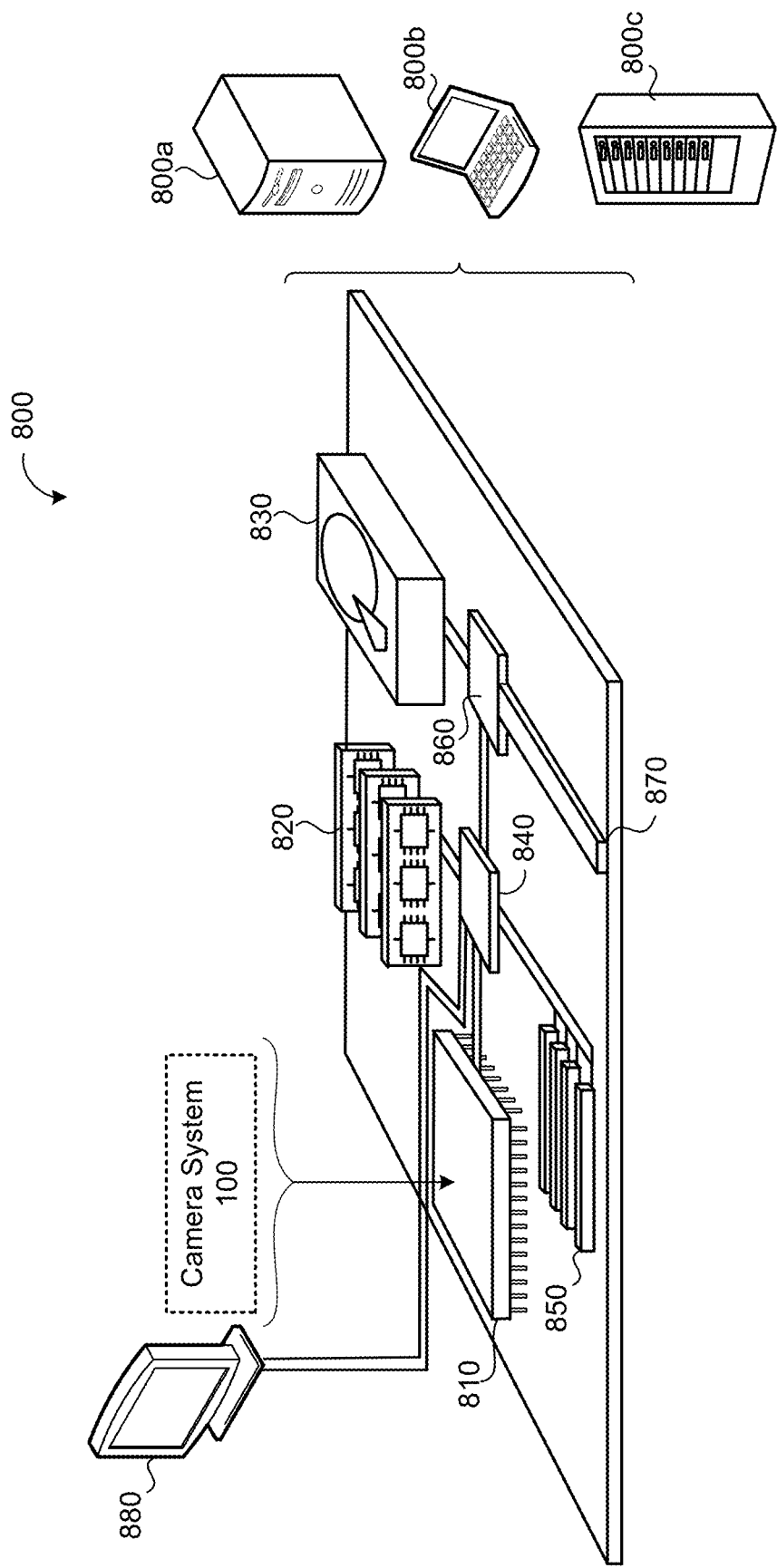
FIG. 8 is a schematic illustration of a computing device that may be used to implement systems and methods of the embodiments disclosed herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high-speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A driver assistance system for a vehicle comprising:
a camera system having at least two rear-facing cameras, each camera constructed and arranged to obtain an image of an area behind a rear of the vehicle;
a tailgate position determining system constructed and arranged to determine a position of a tailgate of the vehicle; and
an electronic control unit having a processor circuit configured to receive a plurality of images provided by the at least two cameras of the camera system, and select one or more images of the plurality of images based upon the determined position of the tailgate of the vehicle for use in a driver assistance operation,
wherein the at least two rear-facing cameras comprise a first camera fixedly disposed along the tailgate so as to move therewith, and a second camera disposed proximate a central rear brake light of the vehicle, and upon an affirmative determination by the electronic control unit that the position of the tailgate is in an open position, the electronic control unit selects as the selected one or more images a first image captured by the first camera and a second image captured by the second camera, and combines the first and second images to generate a combined image for use in the driver assistance operation.

2. The system of claim 1, wherein the processor circuit is configured to create a combined image from an image received from each of the at least two cameras.

3. The system of claim 1, wherein the electronic control unit is further configured to send at least one instruction to a display screen of the vehicle to display on the display screen the combined image.

4. The system of claim 1, wherein the tailgate position determining system includes the electronic control unit being configured to perform image processing on at least one image captured by the at least two rear-facing cameras, detect a representation of the tailgate in the at least one image, and determine the position of the tailgate based on the representation of the tailgate in the at least one image.

5. A method of providing a rear image for a vehicle comprising:

determining a tailgate position of a tailgate of the vehicle with a tailgate position determining system; and receiving, by a control circuit, a plurality of images from at least two rearward facing cameras disposed on the vehicle, the at least two cameras comprising a first camera fixedly disposed along the tailgate so as to move therewith, and a second camera that is not connected to the tailgate;

selecting, by the control circuit, one or more of the plurality of images based upon the position of the tailgate of the vehicle for use in a driver assistance operation, wherein upon an affirmative determination by the control circuit that the position of the tailgate is in an open position, the control circuit selects as the selected one or more images a first image captured by the first camera and a second image captured by the second camera, and combines the first and second images to generate a combined image for use in the driver assistance operation.

6. The method of claim 5, wherein the second camera is located proximate a central rear brake light of the vehicle.

7. The method of claim 5, further comprising, sending, by the control circuit to a display screen of the vehicle, an instruction to display the combined image.

8. The method of claim 5, wherein the tailgate position determining system includes the control circuit being configured to perform image processing on at least one image captured by the at least two rearward facing cameras, detect a representation of the tailgate in the at least one image, and determine the position of the tailgate based on the representation of the tailgate in the at least one image.

* * * * *